July 28, 1936.  H. C. FALKNOR  2,048,788
TRAILER BRAKE
Filed Dec. 2, 1935   2 Sheets-Sheet 2
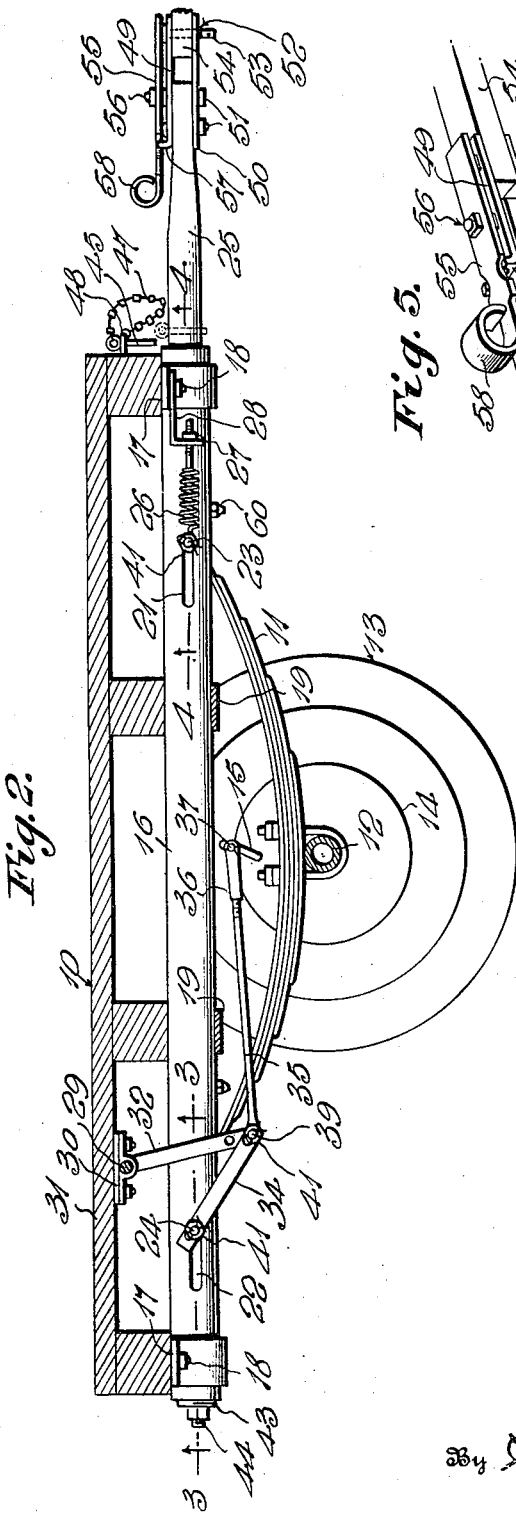
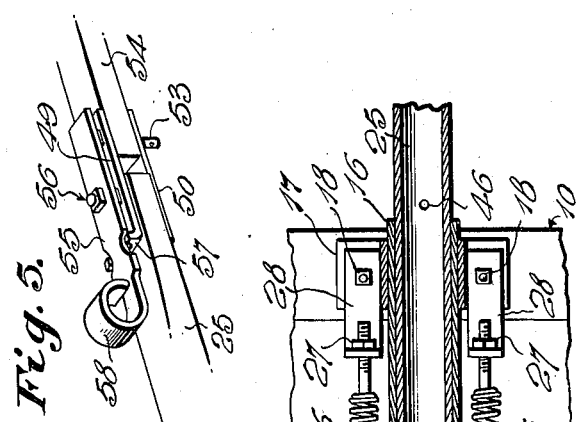
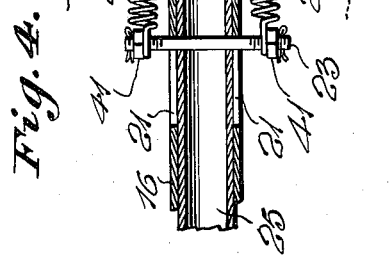
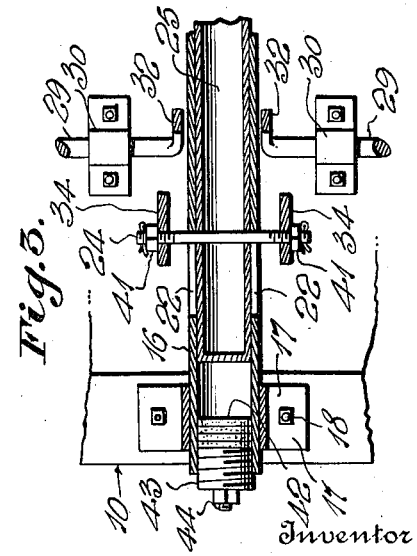
Inventor
H. C. Falknor
By H. B. Wilson & Co.
Attorneys.

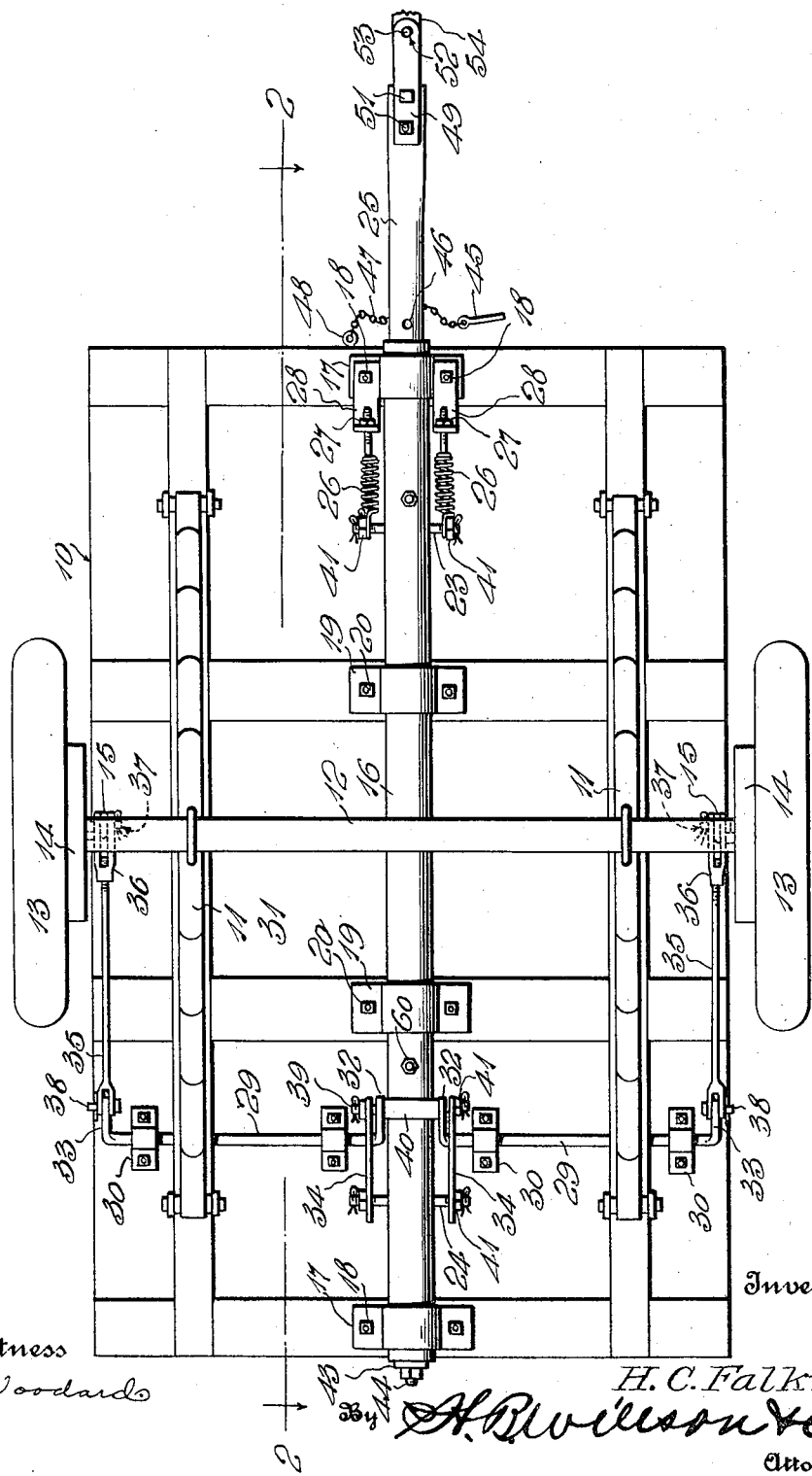

Patented July 28, 1936

2,048,788

UNITED STATES PATENT OFFICE 2,048,788

TRAILER BRAKE

Harold C. Falknor, New Madison, Ohio

Application December 2, 1935, Serial No. 52,599

2 Claims. (Cl. 188—142)

The invention aims to provide an exceptionally simple and inexpensive, yet an efficient, reliable and easily adjustable actuating means for the brakes of trailers, primarily those used in connection with motor vehicles.

With the foregoing in view, the invention resides in the novel subject matter hereinafter described and claimed, description being accomplished by reference to the accompanying drawings.

Fig. 1 is a bottom plan view of a trailer equipped with the invention.

Fig. 2 is a longitudinal sectional view on line 2—2 of Fig. 1.

Figs. 3 and 4 are horizontal sectional views on lines 3—3 and 4—4 of Fig. 2.

Fig. 5 is a perspective view of the preferred form of hitch used in connecting the trailer tongue with the anterior vehicle.

A preferred construction has been illustrated and will be rather specifically described, with the understanding however, that within the scope of the invention as claimed, variations may be made.

A trailer bed frame 10 is shown supported by springs 11 upon an axle 12, the wheels 13 of said axle being provided with conventional wheel brakes 14 whose actuating levers are shown at 15.

A metal tube 16 is secured to and extends centrally along the lower side of the bed frame 10, said tube being preferably provided with lateral lugs 17 welded or otherwise secured thereto, and fastened by bolts 18 to said bed frame. Substantially U-shaped straps 19 may also extend under the tube 16 and may be secured by bolts 20 the bed frame 10 to additionally secure said tube and bed frame together.

The tube 16 is provided with a front pair of opposed longitudinal slots 21 and with a rear pair of opposed longitudinal slots 22. Front and rear pins 23 and 24 respectively pass through openings in a tongue 25 which is slidably received in the tube 16.

The projecting ends of the front pin 23 are connected with the rear ends of coiled springs 26, the front ends of these springs being adjustably connected at 27 to brackets 28 which may be secured by the bolts 18 which fasten the foremost of the lugs 17. The springs 26 pull upon the pin 23 and normally hold the tongue forwardly with respect to the tube 16 until said pin strikes the front ends of the slots 21 and the pin 24 strikes the front ends of the slots 22, said pins and slot ends thus establishing rigid pull connections between the tongue 25 and the tube 16.

Two transverse rocker shafts 29 are mounted in appropriate bearings 30 secured to the trailer bed 31, the inner ends of said rocker shafts being provided with downwardly projecting arms 32 and the outer ends of said shafts being provided with similar arms 33. The inner arms 32 are connected by links 34 with the projecting ends of the pin 24 and the arms 33 are linked by rods 35 to the levers 15 of the brakes 14. The front ends of the rods 35 are provided with conventional adjustable terminals 36 connected by pivot pins 37 with the levers 15, the rear ends of said rods being connected by pins 38 with the arms 33. The pins 37 and 38 are held against accidental removal by cotter pins in the usual way.

In connecting the arms 32 with the links 34, a pin 39 is passed through these parts, and a spacing sleeve 40 is preferably mounted on said pin between said arms 32. On the ends of all of the pins 24, 39 and 23, nuts 41 locked by suitable cotter keys are preferably employed.

As long as the leading vehicle must pull the trailer, the tongue 25 is held forwardly with respect to the tube 16 and the brakes are held in released position. When the leading vehicle is slowed down however, and the trailer moves forwardly with respect to it, either on a hill or on a relatively level stretch, the connecting elements between the pin 24 and the brakes 14, apply these brakes. The extent of application is preferably limited by a bumper 42 carried by a closure 43 threaded into the rear end of the tube 16. The bumper 42 may well be composed of a plurality of resilient washers secured to the inner end of the closure 43 by a bolt 44.

The tension on the springs 26 may be adjusted as desired by means of the adjustable anchorages 27 for the front ends of said springs, and said springs are always adjusted to such tension as to prevent the trailer from needlessly moving forwardly and rearwardly with respect to the leading vehicle, when passing over small rises or into depressions in the roadway. The brake-operating means may be adjusted to the desired sensitivity by disconnecting the rear ends of the rods 35 from the arms 33, rotating said rods to thread them greater distances into the terminals 36, and again reconnecting said rods with said arms.

To prevent application of the brakes when backing, a pin 45 is provided for passage through an opening 46 in the tongue 25, to abut the front end of the tube 16 and prevent rearward movement of said tongue within said tube. Pin 45 is preferably carried by a chain 47 connected with the bed frame 10 by means of an eye-bolt or screw 48. When the pin 45 is not in use, it may pass through the eye of the bolt or screw 48.

I have shown a preferred hitch for connecting the tongue 25 with the leading vehicle. This hitch includes upper and lower horizontally elongated plates 49 and 50 secured by bolts or the like 51 to the upper and lower sides of the tongue 25. The plates 49 and 50 project forwardly from the tongue 25 and are formed with openings 52 through which to pass a hitch pin 53, which pin passes also through an opening in a part 54 carried by the leading vehicle. A horizontally swingable latch 55 is pivoted at 56 upon the plate 49 to normally overlie the hitch pin 53 and prevent accidental removal thereof. The plate 49 is provided with upwardly projecting lugs 57 between which the rear end of the latch 55 is normally seated. This latch, however, is formed of spring steel or the like and it is provided with a handle 58 by means of which it may be sprung upwardly to clear the lugs 57 and swung horizontally to a released position. When the latch is again moved to operative position and the handle 58 released, said latch springs downwardly between the lugs 57 so that it is firmly held in operative position and the hitch pin 53 cannot, therefore, jar out of the hitch.

It will be seen from the foregoing that novel and advantageous provision has been made for carrying out the object of the invention, and while preferred details have been shown, it will be obvious that variations may be made within the scope of the invention as claimed, and that I am not restricted to proportion, materials, etc. Moreover, while I have not shown any reinforcements for stiffening the tube 16 and the tongue 25, it will be obvious that such additions fall within the skill of the mechanic and may be made if desired. Also, suitable provision may be made for lubrication and I have shown nipples 60 for injecting lubricant into the tube 16.

I claim:—

1. In a brake-actuating means for a trailer having wheel brakes; a central longitudinal tube secured to the trailer and having front and rear pairs of opposed longitudinal slots, a tongue slidable in said tube and having front and rear pairs of projections passing through the front and rear slots respectively, springs anchored to the trailer and connected with one pair of said projections to normally hold the tongue forwardly with respect to said tube, and brake-applying connections operatively connecting the other pair of projections with said wheel brakes.

2. In a brake-actuating means for a trailer having wheel brakes; a central longitudinal tube secured to the trailer and having longitudinal slots in opposite sides, a tongue slidable in said tube, a transverse pin passing through said tongue and having projecting ends extending through said slots, links at opposite sides of said tube and pivoted to said pin ends, and rocker shafts mounted on the trailer and having arms pivoted to said links, said rocker shafts being provided also with other arms linked to said wheel brakes.

HAROLD C. FALKNOR.